United States Patent

Lawless

[15] 3,649,891
[45] Mar. 14, 1972

[54] CAPACITIVE CRYOGENIC THERMOMETER

[72] Inventor: William N. Lawless, Corning, N.Y.

[73] Assignee: Corning Glass Works, Corning, N.Y.

[22] Filed: June 18, 1970

[21] Appl. No.: 47,334

[52] U.S. Cl. ..............................317/247, 106/39, 317/258
[51] Int. Cl. ..........................................................H01g 7/04
[58] Field of Search ......................317/258, 261, 247; 106/39

[56] References Cited

UNITED STATES PATENTS

| | | | |
|---|---|---|---|
| 2,736,080 | 2/1956 | Walker | 317/261 |
| 3,195,030 | 7/1965 | Herczog | 317/258 |
| 3,293,077 | 12/1966 | Kaiser | 317/258 X |

*Primary Examiner*—E. A. Goldberg
*Attorney*—Clarence R. Patty, Jr. and Walter S. Zebrowski

[57] ABSTRACT

A capacitive device suitable for use in cryogenic temperature measuring. The dielectric material used in the capacitor is made from a composition in which strontium titanate, $SrTiO_3$, has been controllably crystallized in a glass matrix. A capacitive device having this type of dielectric material is particularly useful in measuring cryogenic temperatures in that the dielectric constant of such a dielectric material decreases smoothly with decreasing temperature, varies linearly with temperature over a suitable portion of the range thereof, and possesses a large sensitivity in the cryogenic temperature range.

8 Claims, 4 Drawing Figures

INVENTOR.
William N. Lawless

CAPACITIVE CRYOGENIC THERMOMETER

BACKGROUND OF THE INVENTION

1. Field of Invention

This invention relates to cryogenic temperature measuring devices having large sensitivity to temperature changes at least as low as 0.10° K. and up to 65° K. More specifically, this invention relates to a capacitive thermometer wherein the dielectric material is formed of strontium titanate, $SrTiO_3$, crystallized in alumino-silicate glass.

2. Background of the Invention

The conventional cryogenic thermometers, that is, resistance thermometers, have several characteristics that tend to degrade the accuracy of the thermometers or make their use difficult or both. Resistance thermometers which display useful sensitivities in the cryogenic temperature range do not follow a well-defined mathematical law and so must be calibrated point-by-point, rather than at just two points. The resistance thermometers, by virtue of the fact that they are resistive, are self-heating thereby increasing the temperature, and this self-heating usually increases with decreasing temperature. In addition, resistance thermometers are seriously affected by magnetic fields resulting from the well known Hall effect and so are not reliable for use in or around magnetic fields, such as may be generated by superconducting magnets. Finally, resistance thermometers are so-called for lead devices, 2 current and 2 voltage, some varieties of which have polarity.

SUMMARY OF THE INVENTION

Therefore, it is an object of this invention to provide a device sensitive to temperature changes suitable for use as a cryogenic temperature-measuring device and which overcomes all of the aforementioned disadvantages.

Briefly, this invention comprises a capacitive device for use in cryogenic temperature-determining apparatus, said device having a dielectric material that has dielectric constant changes with temperature changes at temperatures within the cryogenic temperature range. The invention comprises a plurality of electrically conductive layers each separated from adjacent layers by a dielectric material made of glass from which strontium titanate in combination with other dopants has been controllably crystallized, and input and output terminals each respectively connected to two of said electrically conducting layers, each of the remaining conducting layers being connected to one or the other of said terminals.

DETAILED DESCRIPTION OF THE INVENTION

Figure 1:
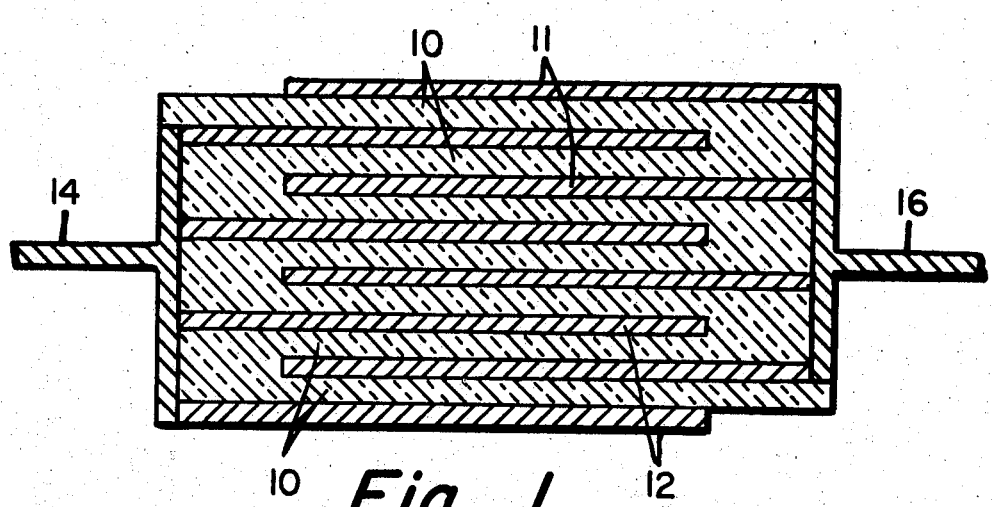
FIG. 1 is a sectional view of a capacitive device made in accordance with this invention.

In FIG. 1 is shown a capacitive device comprising thin layers 10, of a dielectric made in accordance with this invention, thin strips, coatings, or films 11 and 12 of metal or other electrically conducting material in contact with the opposite faces of the layers 10, and leads 14 and 16. Leads 14 and 16 are formed of ribbon or wire in electrical contact with the opposite edges of the conducting strips 11 and 12 respectively. Any known multilayer-capacitor fabrication technique may be used in the practice of this invention, and it will be obvious that the resulting devices are not to be limited to any particular number of conducting strips but may comprise a plurality of alternate conducting strips with individual leads or terminals appropriately attached, adjacent strips being separated by the interposed dielectric layers. Thus, the devices in which there are several electrically conducting layers, two of said layers being connected respectively to input and output terminals, the remaining electrically conducting layers each may be connected alternately or otherwise to one or the other of said terminals.

I have discovered a family of dielectric materials suitable for low-temperature thermometry, resulting from the dielectric constant having a strong temperature dependence below approximately 65° K. These materials are strontium titanate-containing glasses from which the strontium titanate, for example pervoskite strontium titanate, has been controllably crystallized, and results in a body, composed of a multiplicity of uniform very fine grain crystals substantially homogenously dispersed in a glassy matrix and forming a large proportion thereof. I have found that such materials can be obtained when at least 50 percent by weight of strontium titanate, including 0 to 5 percent by weight of dopants, is melted into a glass, and that a low-temperature ferroelectric strontium titanate can be subsequently crystallized in this glass upon reheating between 800° C. and 1,300° C., for a time period of at least 1 hour at 800° C. and at least ½ minute at 1,300° C. A more complete discussion of a suitable heat treatment process used for the formation of crystals may be found in the A. Herczog and S. D. Stookey patent, U.S. Pat. No. 3,195,030 which is incorporated herein by reference. With proper heat treatment, strontium titanate is the major crystallized phase that will result. It is to be understood that said glass can be heat treated prior to use in or formation of an ultimate device, or such device may be formed using the glass and thereafter be subjected to heat treatment whereby the strontium titanate is crystallized in situ. Small additions of rare-earth oxides such as niobium oxide, tantalum oxide, vanadium oxide and bismuth oxide up to 5 percent by weight may be made. Such dopants

TABLE I

| Example | $SrTiO_3$ | $SrCO_3$ | $TiO_2$ | $SiO_2$ | $Al_2O_3$ | $Nb_2O_5$ | $V_2O_5$ | $Ta_2O_5$ | $Bi_2O_5$ |
|---|---|---|---|---|---|---|---|---|---|
| 1 | | 49.4 | 26.7 | 19.9 | 4.0 | | | | |
| 2 | 72.0 | | | 18.7 | 9.3 | | | | |
| 3 | 57.8 | 12.5 | | 21.1 | 8.6 | | | | |
| 4 | 68.4 | 0.6 | | 20.0 | 10.0 | 1.0 | | | |
| 5 | 62.8 | 2.7 | | 19.8 | 9.9 | 4.8 | | | |
| 6 | | 47.4 | 25.1 | 21.5 | 4.3 | 1.7 | | | |
| 7 | 68.4 | 0.6 | | 20.0 | 10.0 | | 1.0 | | |
| 8 | 62.8 | 2.7 | | 19.8 | 9.9 | | 4.8 | | |
| 9 | | 47.4 | 25.1 | 21.5 | 4.3 | | 1.7 | | |
| 10 | 68.4 | 0.6 | | 20.0 | 10.0 | | | 1.0 | |
| 11 | 62.8 | 2.7 | | 19.8 | 9.9 | | | 4.8 | |
| 12 | | 47.4 | 25.1 | 21.5 | 4.3 | | | 1.7 | |
| 13 | 68.4 | 0.6 | | 20.0 | 10.0 | | | | 1.0 |
| 14 | 62.8 | 2.7 | | 19.8 | 9.9 | | | | 4.8 |
| 15 | | 47.4 | 25.1 | 21.5 | 4.3 | | | | 1.7 |
| 16 | | 50.4 | 27.3 | 18.6 | 3.7 | | | | |
| 17 | | 50.1 | 27.1 | 19.0 | 3.8 | | | | |
| 18 | | 47.9 | 25.9 | 17.5 | 8.7 | | | | |
| 19 | | 49.1 | 26.6 | 19.4 | 4.9 | | | | | tend to stabilize the titanate phase and yield a smooth dielectric constant vs. temperature relationship. Suitable glasses for forming the glass matrix of the present invention may be alumino-silicate, borate, phosphate, or germanite glasses.

Table I represents examples of compositions on a batch basis in percent by weight which, when heat treated as herein set forth, provide dielectric material comprising strontium titanate crystals in a glass matrix suitable for the purposes of the present invention.

Figure 3:
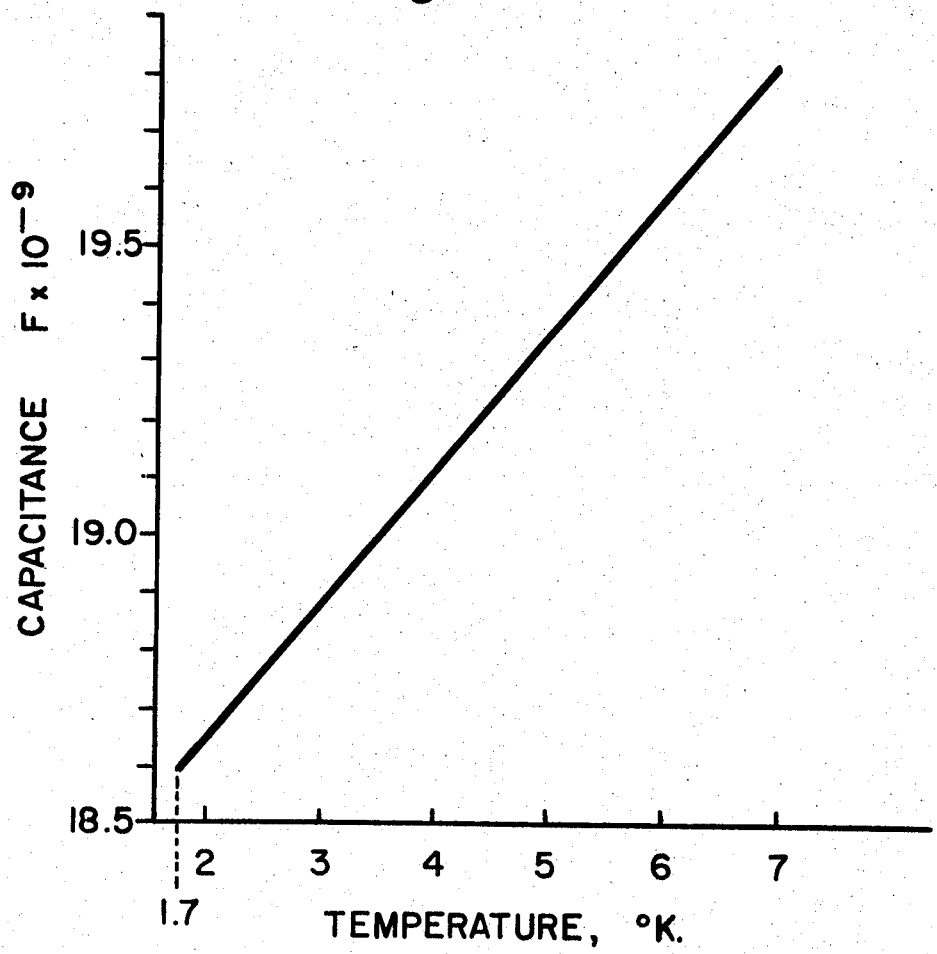
FIG. 3 is a graphical representation similar to that of FIG. 2 showing in more detail the temperature range of 1.7° K. to 7° K.
Figure 2:
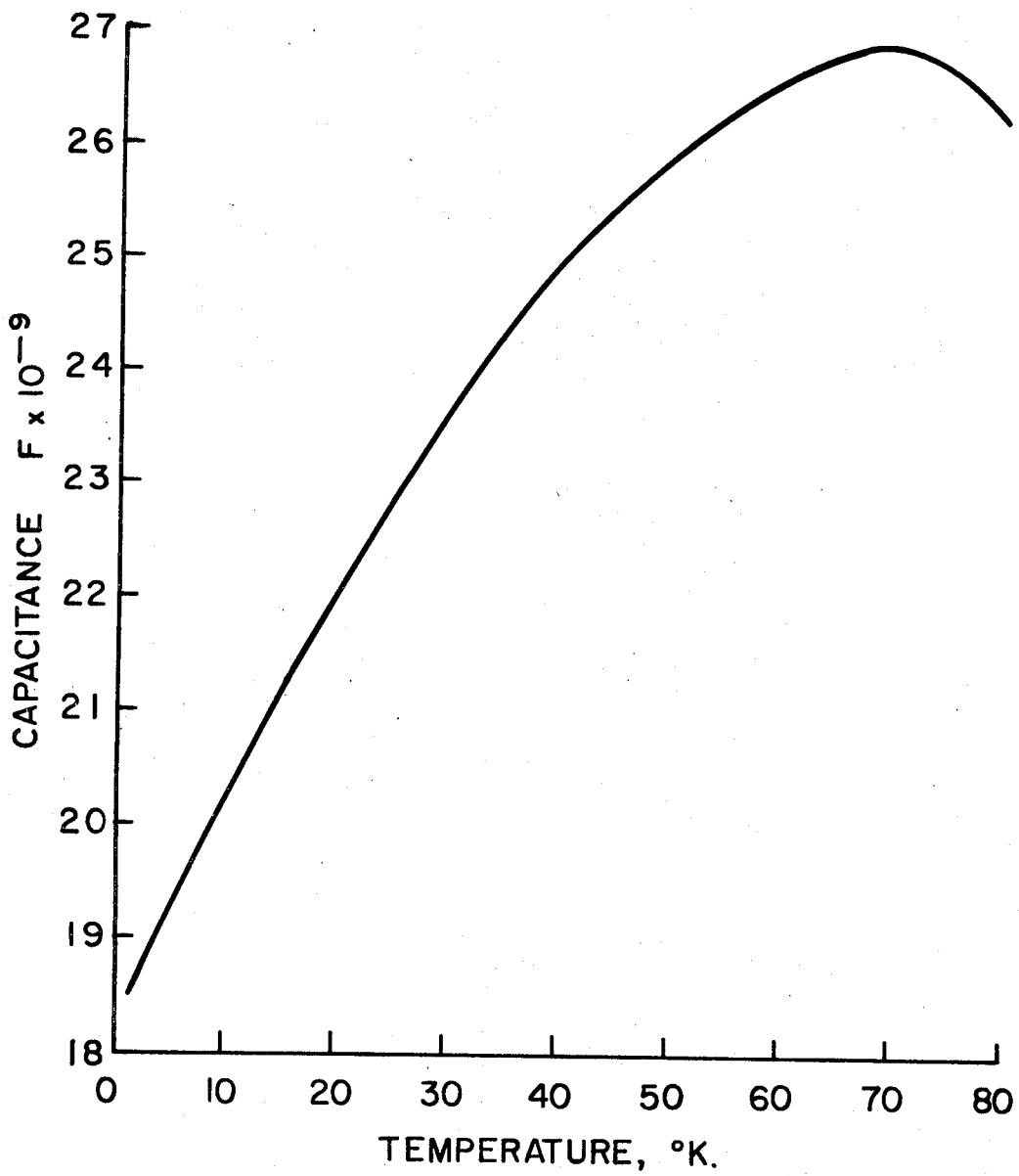
FIG. 2 is a graphical representation showing the relation between temperature in degrees Kelvin and the capacitance in nanofarads of the device made in accordance with the practice of this invention.
Figure 4:
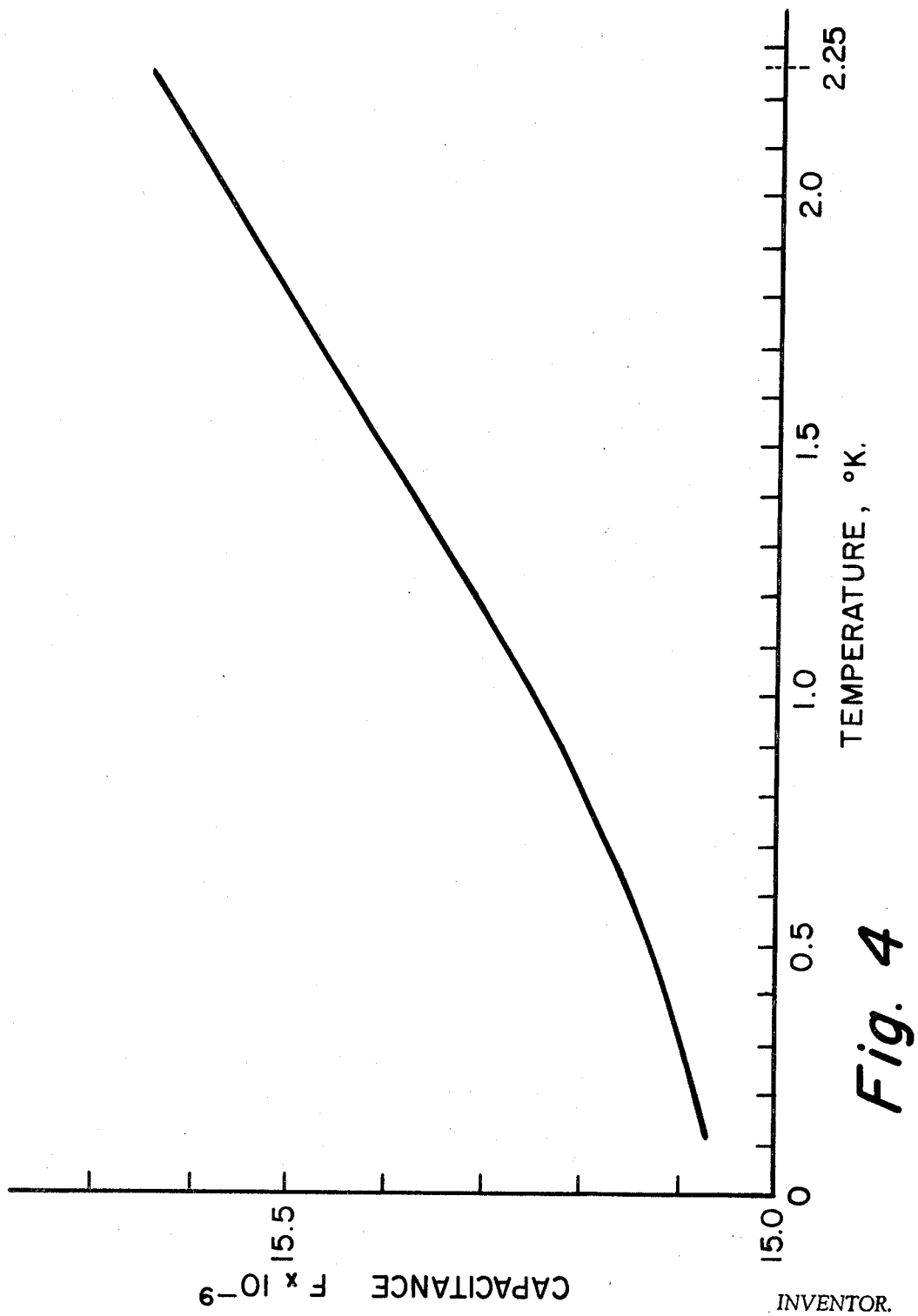
FIG. 4 is a graphical representation similar to that of FIG. 2 showing in more detail the temperature range of 0.1° K. to 2.25° K.

A specific example of a capacitive cryogenic thermometer follows. A glass batch in percent by weight comprising 68.4 percent strontium titanate, $SrTiO_3$; 0.6 percent strontium carbonate, $SrCO_3$; 20.0 percent silica, $SiO_2$; 10.0 percent alumina, $Al_2O_3$; and 1.0 percent niobia $Nb_2O_5$ was melted in a platinum crucible at 1,650° C. to form a glass. Strontium titanate was then crystallized from the above formed glass by heat treating for approximately 2 hours at 1,100° C. A 51 layer capacitive sensor measuring approximately 6×2×1 mm. was fabricated using this material as the dielectric. Gold-platinum alloy conductive material films or coatings were interposed between dielectric layers to form electrodes. The capacitance-temperature characteristics and power dissipation characteristics of this sensor from 1.7° K. to 80° K. were measured in a conventional helium cryostat. A conventional $He^3$–$He^4$ dilution refrigerator was used to measure these characteristics between 0.1° K. and 2.5° K. The results of these measurements are shown plotted in FIGS. 2, 3 and 4, and from these curves it can be seen that this type of sensor has a smooth capacitance vs. temperature behavior over the range of 65° K. down to at least 0.10° K. Furthermore, this type of sensor has substantially a linear capacitance to temperature behavior from 1.1° K. to 6.5° K. as illustrated in FIG. 3. In addition, the sensor is extremely sensitive over the range 0.10° K. to 60° K., being of the order of 200 picofarads per degree, and is most sensitive over the linear range, 1.1° K. to 6.5° K. Because capacitance bridges can resolve capacitance to, ±0.05 picofarads at the 20 nanofarad level, which is applicable to the above described sensor, temperature can be measured with this sensor to an accuracy of ±0.25 millidegree Kelvin in the linear range.

The effect of a magnetic field on temperature measurement using this sensor was measured by immersing a conventional 100 kilogauss superconducting magnet in a bath of liquid helium at 4.2° K. The sensor was positioned within the magnetic field of the magnet, and the capacitance was measured as a magnetic field was slowly increased up to 100 kilogauss. There was no effect of the magnetic field on the measured capacitance within the accuracy of the measuring instrument, which accuracy was within ±0.5 millidegree Kelvin. The self-heating of the sensor was derived from the aforementioned capacitance and power dissipation measurements. For a measuring frequency of 1 kilohertz and a measuring voltage of 10 millivolts (RMS) self-heating at 4.2° K. was typically 1 microwatt and increases with decreasing temperature.

Although the present invention has been described with respect to specific examples, it is not intended that such specific examples be limiting upon the scope of the invention except insofar as is set forth in the following claims.

I claim:
1. A capacitive device comprising
a dielectric layer formed of a material consisting of a glass matrix, 0 to 5 percent by weight of at least one dopant, and crystalline strontium titanate, said material being formed from a glass containing at least 50 percent by weight of strontium titanate from and within which glass at least a portion of said strontium titanate is crystallized by heat treatment of said glass,
electrically conductive members disposed adjacent each side of said layer, and
terminal means connected to said members, the capacitance of said device being a determinable and measureable function of temperature.
2. The capacitive device of claim 1 wherein the dopants are selected from the group consisting of tantalum oxide, bismuth oxide, vanadium oxide and niobium oxide.
3. The capacitive device of claim 1 having more than two electrically conductive members, each said member being separated from adjacent members by one said dielectric layer.
4. The capacitive device of claim 1 wherein said glass matrix consists of a glass selected from the group consisting of alumino-silicate glass, borate glass, phosphate glass and germanite glass.
5. The capacitive device of claim 1 wherein said strontium titanate is crystalized in situ.
6. A capacitive cryogenic thermometer comprising
a plurality of electrically conductive members,
a dielectric layer disposed between adjacent conductive members and being formed of material consisting of a glass matrix, 0 to 5 percent by weight of at least one dopant selected from the group consisting of tantalum oxide, bismuth oxide, vanadium oxide, and niobium oxide, and crystalline strontium titanate, said material being formed from a glass containing at least 50 percent by weight of strontium titanate from and within which glass at least a portion of said strontium titanate is crystallized by heat treatment of said glass, and terminal means connected to said members, the capacitance of said thermometer being a function of temperature whereby temperature is determined by measuring the capacitance thereof.
7. The thermometer of claim 6 wherein said glass matrix consists of alumino-silicate glass.
8. The thermometer of claim 7 wherein said strontium titanate is crystallized in situ.

UNITED STATES PATENT OFFICE
CERTIFICATE OF CORRECTION

Patent No. 3,649,891          Dated March 14, 1972

Inventor(s)  William N. Lawless

It is certified that error appears in the above-identified patent and that said Letters Patent are hereby corrected as shown below:

Column 2, line 75, delete "rare-earth".

Signed and sealed this 17th day of October 1972.

(SEAL)
Attest:

EDWARD M. FLETCHER, JR.
Attesting Officer

ROBERT GOTTSCHALK
Commissioner of Patents